United States Patent [19]

Okano et al.

[11] 3,951,475
[45] Apr. 20, 1976

[54] RESILIENTLY MOUNTED GAS BEARING DEVICE

[75] Inventors: Hiroshi Okano; Yushiro Yasuda, both of Susono, Japan

[73] Assignee: Toyota Jidosha Kogyo Kabushiki Kaisha, Toyota, Japan

[22] Filed: Oct. 10, 1973

[21] Appl. No.: 405,171

[30] Foreign Application Priority Data
Apr. 24, 1973  Japan................................ 48-46417

[52] U.S. Cl................................... 308/9; 308/73; 308/121
[51] Int. Cl.²................... F16C 17/06; F16C 19/04; F16C 23/04; F16C 35/02
[58] Field of Search.............. 308/9, 15, 73, 76, 77, 308/78, 160, 168, 240, 121

[56] References Cited
UNITED STATES PATENTS

| | | | |
|---|---|---|---|
| 1,595,744 | 8/1926 | Trumpler | 308/73 X |
| 3,804,472 | 4/1974 | Schuller et al. | 308/73 |
| 3,830,552 | 8/1974 | Schuller et al. | 308/121 |

FOREIGN PATENTS OR APPLICATIONS

| | | | |
|---|---|---|---|
| 926,644 | 4/1955 | Germany | 308/73 |

*Primary Examiner*—Robert J. Spar
*Assistant Examiner*—Howard Beltran
*Attorney, Agent, or Firm*—Stevens, Davis, Miller & Mosher

[57] ABSTRACT

A dynamic pressure gas bearing device adapted to provide a floating support for a shaft rotating at a high speed and comprising a plurality of bearing pads each carried on a pivot and encircling the shaft. Each bearing pad comprises a relatively thin bearing shell having a part-cylindrical shape and a curved inner surface encircling the shaft and substantially complementary to the peripheral surface thereof, and a member made of an elastic material and associated with the bearing shell to substantially enclose the outer surface of the bearing shell and hold the bearing shell resiliently against the pivot.

10 Claims, 21 Drawing Figures

RESILIENTLY MOUNTED GAS BEARING DEVICE

This invention relates to a gas bearing device, and more particularly to a gas bearing device for a gas turbine engine in which the dynamic pressure generated by the rotation of a shaft provides a floating support for the shaft.

Bearings of this kind have hitherto been known in the form of a plurality of bearing pads disposed around a rotatable shaft and spaced a slight distance therefrom. Each of the pads is shaped like a fraction of a hollow cylinder having an inner surface complementary to the outer surface of the shaft. A steel ball receiving plate is attached to the outer surface of each pad and formed on its outer surface with a recess for receiving a steel ball. The steel ball is bonded or otherwise secured to one end of a pivot secured at the other end to a casing for the bearing device.

These known gas bearing devices have the following drawbacks:

a. The highly precise finish required on the inner surface of the bearing pad to obtain the necessary dimensional accuracy and surface roughness requires complicated jigs and plenty of time because of the presence of the steel ball receiving plate on the outer surface of the pad.

b. In order to provide an additional rigidity for the pad to ensure an adequate inner surface finish without causing any warpage, it is necessary to make the pad of a considerably thick material, though the pad is required to support a much smaller load than any other type of bearings (e.g., ball bearings). The extra thickness required makes the pad unreasonably costly because the pad is made of an expensive material, and adds undesirably to the total weight of the bearing device.

c. The extra weight of the pad increases the moment of inertia of the pad about the center of its rotation, i.e., the center of the steel ball, which in turn retards the rotary motion of the pad about the center of the steel ball. Consequently, the pad fails to function quickly in response to a sudden change in the operating conditions of the equipment on which the bearing device is installed, and the pad tends to be undesirably brought into frictional contact with the shaft and overheated by the frictional heat, resulting in the worst case in the welding together of the pad and the shaft.

d. Since the extra thickness of the pad increases the heat capacity of the pad, the pad does not easily deform itself in response to a sudden change in the ambient temperature even if the shaft is thermally deformed, but tends to be contacted by the shaft and overheated by frictional heat.

It is an object of this invention to eliminate the above mentioned drawbacks of the known gas bearing devices and provide an improved gas bearing device comprising a plurality of bearing pads, each pad comprising two component parts, namely, a bearing shell having an inner surface complementary to the outer surface of a shaft and a member for holding the bearing shell.

It is another object of this invention to provide various forms of bearing pads adapted to eliminate the above mentioned drawbacks of the known devices.

In the gas bearing device according to this invention, each of the bearing pads disposed around a rotatable shaft comprises two parts, i.e., a part-cylindrically shaped bearing shell having a relatively small thickness and a shell holder formed of a relatively thin elastic material and associated with the bearing shell to resiliently hold the shell against a pivot. This invention, thus, provides the following advantages:

a. The bearing shell can be easily manufactured with a minimum of time and labor without requiring any sophisticated jigs or tools, resulting in a drastic reduction in the cost of manufacture thereof.

b. The relatively thin materials of which the bearing shell and the shell holder are made reduce the weight of the pad and the material cost thereof to a considerable extent.

c. Because of its reduced weight, the bearing pad according to this invention has a smaller moment of inertia, and the smaller moment of inertia and the elasticity of the shell holder combine to improve the ability of the pad to respond quickly to a sudden change in the operating conditions of the equipment on which the device is installed (e.g., a sudden change in r.p.m. of a gas turbine or the load applied thereto). With the device of this invention, therefore, there would be less possibility of any bearing shell being brought into undesirable frictional contact with an associated rotating shaft and overheated by frictional heat, resulting in the welding together of the bearing shell and the shaft.

d. Because of it small thickness, the bearing pad of this invention has only a small heat capacity. Therefore, when the rotating shaft has been radially expanded due to an elevated ambient temperature, the bearing shell is also caused by the elevated ambient temperature to spread outwardly away from the shaft to thereby maintain an adequate spacing between the pad and the shaft. This contributes to avoiding any undesirable contact between the bearing shell and the rotating shaft that would overheat the shell and probably weld it to the shaft.

e. The leaf spring used in the known gas bearing device to support the pivot for the pad located immediately above an associated rotatable shaft and thereby preload that particular pad may be omitted in the device of this invention because the necessary resiliency is provided by the shell holder itself.

f. The shell holder can be easily manufactured in various forms by any appropriate machine or apparatus. e.g., by a press.

The foregoing and other objects and advantages of this invention will become apparent from the following detailed description, and the accompanying drawings, in which.

through 6(c).

Figure 1:
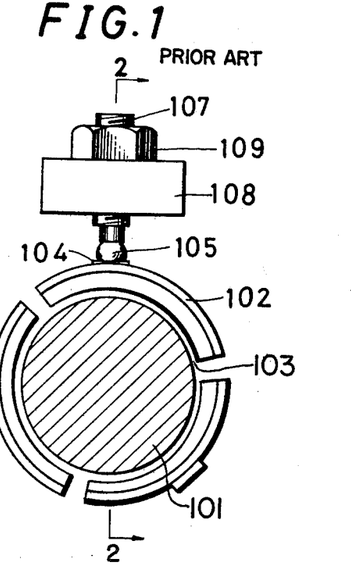
FIG. 1 is a front elevational view of a gas bearing device known in the art.
Figure 2:
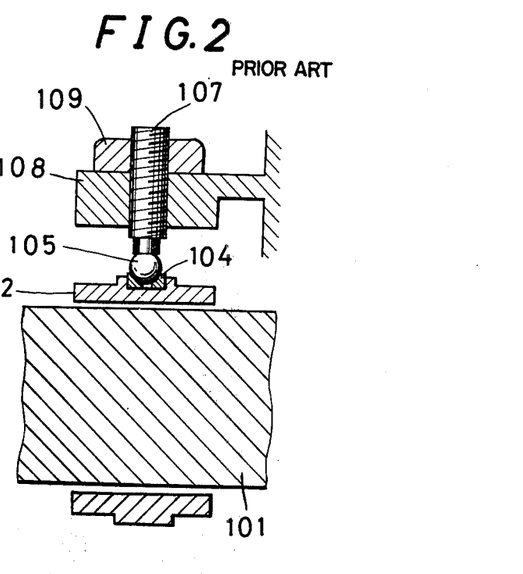
FIG. 2 is a vertical sectional view taken along the line 2—2 of FIG. 1.
Figure 3:
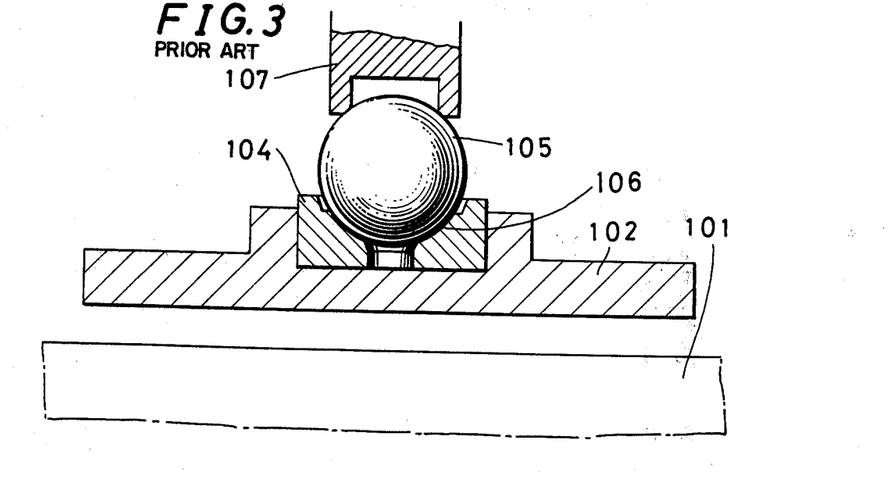
FIG. 3 is a fragmentary enlarged view of the device shown in FIG. 2.

Referring to FIGS. 1 - 3 of the drawings, brief description will first be made of a typical form of the gas bearing device known in the art to clarify the structural difference between the known device and the device of this invention of which detailed description in a preferred form will appear later. A typical form of the known gas bearing device comprises a plurality of bearing pads 102, of which only one is shown in the drawing, disposed around a rotatable shaft 101 to form a small annular clearance 103 between the shaft 101 and the pads 102 upon rotation of the shaft 101. Each bearing pad 102 is shaped like a portion of a hollow cylinder or in other words, the bearing pads 102 form, in combination, a substantially cylindrical body encircling the shaft 101. A steel ball receiving plate 104 is attached to the outer surface of each bearing pad 102 and formed on its outer surface with a semi-spherical recess 106 for receiving a steel ball 105. Each steel ball 105 is bonded or otherwise secured to one end of a pivot 107, and the other end of each pivot 107 extends through the wall of a casing 108 and is secured thereto by a nut 109. It should be recalled that the known gas bearing device herein described briefly in a typical form have various drawbacks as hereinbefore pointed out.

Description will now be made of a preferred embodiment of this invention with reference to FIGS. 4 - 10, throughout which like numerals are used to designate like parts.

Figure 4:
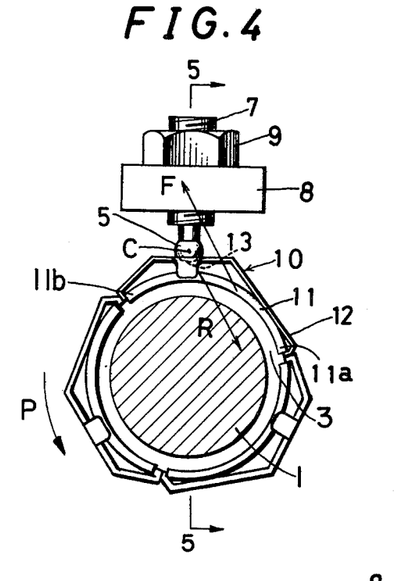
FIG. 4 is a front elevational view of a gas bearing device according to a preferred embodiment of this invention.
Figure 5:
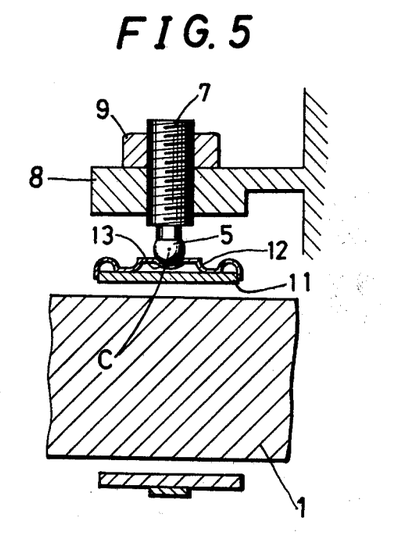
FIG. 5 is a vertical sectional view taken along the line 5—5 of FIG. 4.

Referring to FIG. 4, the gas bearing device of this invention shown therein in a preferred form comprises a plurality of bearing pads 10, of which only one is shown in the drawing. Each bearing pad 10 consists of two parts. One of the parts of which each bearing pad 10 consists is a bearing shell 11 having a part-cylindrical shape, and a slightly larger radius of curvature than the radius of a rotatable shaft 1 encircled by the bearing pads 10. The inner surface of the bearing shell or shells 11 located at the bottom of the device provides an initial sliding surface for the shaft 1 upon rotation of the shaft 1, but it should be noted that there will be no solid contact between any bearing shell 11 and the shaft 1 during the rotation of the latter at a sufficiently high speed. The other part is a shell holder 12 associated with each bearing shell 11 to hold the latter in position. Each shell holder 12 is made of a thin elastic metal plate and formed substantially in the center of its outer surface with a semispherical recess 13 for receiving a steel ball 5 secured to one end of a pivot 7. The recess 13 is engaged with the steel ball 5 in such a manner that the shell holder 12 is swingable about the steel ball 5. That portion of the under surface of the shell holder 12 above which the ball receiving recess 13 is located is spaced from the upper surface of the bearing shell 11. The other end of each pivot 7 extends through a wall portion of a casing 8 and secured thereto by a nut 9. The pivot 7, the casing 8 and the nut 9 are elements known per se, which are shown in FIGS. 1 – 3 at 107, 108 and 109, respectively.

Each bearing shell 11 is made of a relatively thin metal plate and has an accurately finished inner surface having the necessary roughness and curvature. The four edges defining the inner surface of each bearing shell 11 are suitably beveled so that no edge effect will occur even if one of the edges of the bearing shell 11 is brought into contact with the shaft 1 upon rotation of the bearing pad 10 about the steel ball 5.

The shell holder 12 may be prepared in various forms to provide various modes of supporting the bearing shell 11, and some preferred forms of the shell holder will hereinafter be described.

Figure 6A:
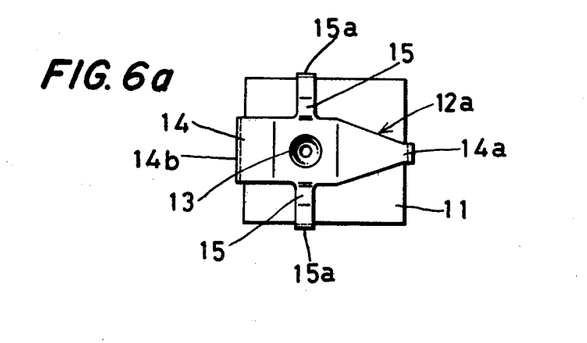
FIG. 6(a) shows a plan view in detail of the bearing shell and the shell holder employed in the gas bearing device of the invention.
Figure 6B:
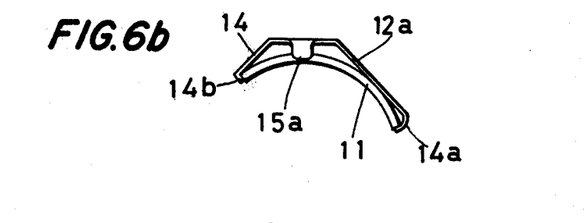
FIG. 6(b) is a front elevational view of FIG. 6(a)
Figure 6C:
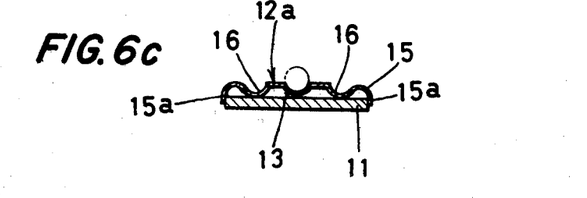
FIG. 6(c) is a side elevational view of FIG. 6(a)

Referring to FIGS. 6(a) through 6c), a first preferred form of shell holder 12a is substantially cross-shaped and comprises a pair of wide arm portions 14 extending in the opposite directions from the ball receiving recess 13 and a pair of narrow arm portions 15 disposed at about right angles to the wide arm portions 14 and extending in the opposite directions from the central portion of the holder 12a in which the ball receiving recess 13 is located. The wide arms 14 are formed at their free ends with inwardly bent portions 14a and 14b, respectively, and the narrow arms 15 are likewise formed with a pair of inwardly bent end portions 15a. The inwardly bent end portions 14a, 14b, 15a and 15a engage the peripheral edges of the bearing shell 11 and cooperate to hold it against displacement around the circumference of the shaft 1 or along the longitudinal axis thereof. It will be noted that the ball receiving recess 13 is located on the point of intersection of the two pairs of arms 14 and 15. Each of the narrow arms 15 is preferably formed with a rounded fold 16 intermediate the ends thereof as shown in FIG. 6(c) to provide the shell holder 12a with an additional structural strength, and the underside of the fold 16 may rest on the bearing shell 11.

Figure 7A:
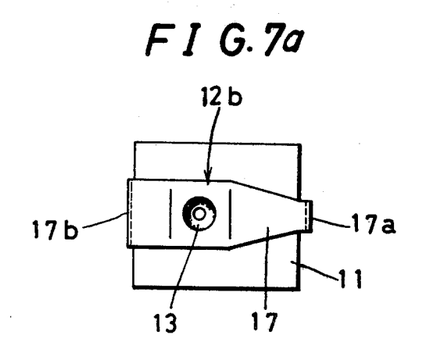
FIG. 7(a) shows a plan view of a modified form of the bearing shell and shell holder shown in FIGS. 6(a)
Figure 7B:
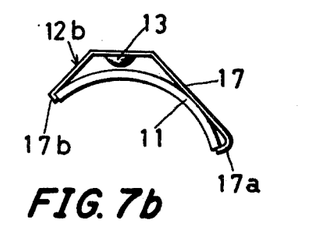
FIG. 7(b) is a front elevational view of FIG. 7(a)

A modified form of the shell holder is shown in FIGS. 7(a) and 7(b) and generally designated at 12b. The shell holder 12b is an elongate member comprising a pair of relatively wide arm portions 17 extending in the opposite directions from the intermediate portion in which a ball receiving recess 13 is located. The arm portions 17 are formed at their free ends with inwardly bent portions 17a and 17b which are engaged with the opposite edges of the bearing shell 11 and cooperate to hold it against displacement around the circumference of the shaft 1 or along the longitudinal axis thereof.

Figure 8A:
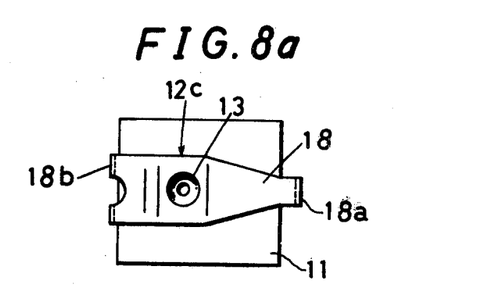
FIG. 8(a) is a plan view of another modified form of the bearing shell and shell holder shown in FIGS. 6(a) through 6(c)
Figure 8B:
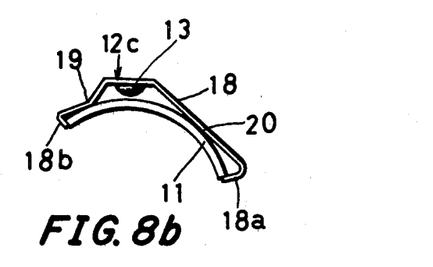
FIG. 8(b) is a front elevational view of FIG. 8(a)

Another modified form of shell holder 12c is shown in FIGS. 8(a) and 8(b) and comprises an elongate member similar to the one shown in FIGS. 7(a) and 7b). The elongate member comprises a pair of oppositely extending arm portions 18 which are formed at their free ends with inwardly bent portions 18a and 18b, respectively, engaging the opposite edges of the bearing shell 11. The shell holder 12c is particularly characterized by a transverse fold 19 formed across one of the arm portions 18 between the ball receiving recess 13 and the inwardly bent portion 18b and contacting the bearing shell 11 to provide an additional support for the shell 11. The other arm portion 18 is also in contact with the bearing shell 11 at 20 to reinforce the support provided by the fold 19.

Figure 9A:
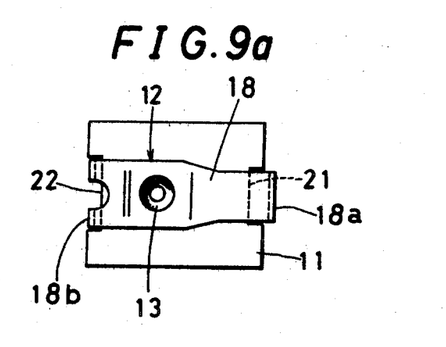
FIG. 9(a) is a plan view of another modified form of the bearing shell and shell holder shown in FIGS. 6(a) through 6(c)
Figure 9B:
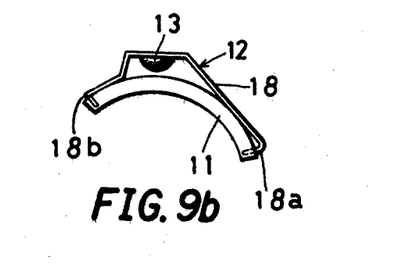
FIG. 9(b) is a front elevational view of FIG. 9(a)

The shell holder 12 shown in FIGS. 9(a) and 9(b) is quite similar to the shell holder 12c of FIGS. 8(a) and 8(b) and has inwardly bent portions 18a and 18b at its opposite ends. A particular feature of the bearing pad arrangement shown in FIG. 9 is the provision of a pair of rectangular cuts 21 and 22 formed on the opposite edges of the bearing shell 11. The inwardly bent portions 18a and 18b of the shell holder 12 are closely engaged with the rectangular cuts 21 and 22, respectively, so that the shell holder 12 provides a securer support for the bearing shell 11.

Figure 10A:
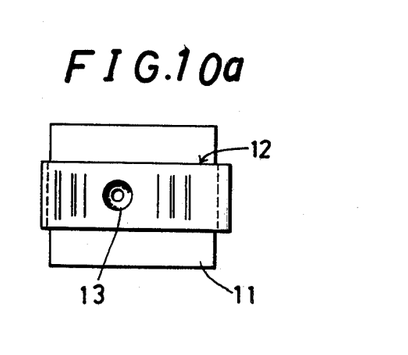
FIG. 10(a) is a plan view of another modified form of the bearing shell and shell holder shown in FIGS. 6(a) through 6(c)
Figure 10B:
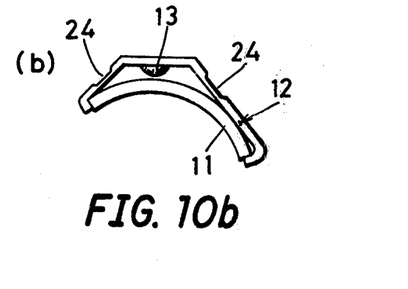
FIG. 10(b) is a front elevational view of FIG. 10(a)

A further modification to the shell holder 12 is illustrated in FIGS. 10(a) and 10(b), and this shell holder is formed with a pair of smaller thickness portions 24 disposed opposite to each other relative to the ball receiving recess 13 to provide an additional resiliency for the shell holder in supporting the bearing shell.

Figure 11A:
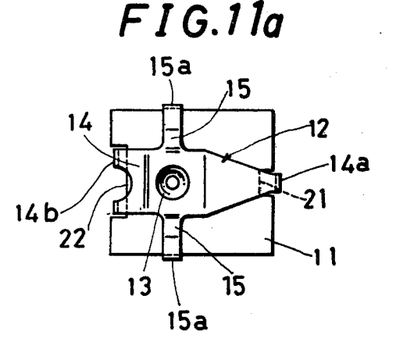
FIG. 11(a) is a plan view of another modified form of the bearing shell and shell holder shown in FIGS. 6(a) through 6(c)
Figure 11B:
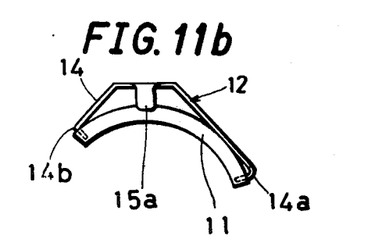
FIG. 11(b) is a front elevational view of FIG. 11(a)

The bearing pad shown in FIGS. 11(a) and 11(b) is a combined modification of those illustrated in FIGS. 6(a) through 6(c) and 9(a) and (b). The shell holder 12 of FIGS. 11(a) and 11(b) is cross-shaped, and a pair of wider arm portions 14 are inwardly bent at their free ends as at 14a and engaged with two cuts 21 and 22 formed on a pair of opposite edges of a bearing shell 11.

Figure 12A:
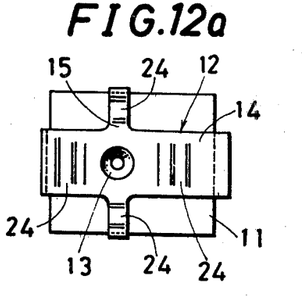
FIG. 12(a) is a plan view of another modified form of the bearing shell and shell holder shown in FIGS. 6(a) through 6(c)
Figure 12B:
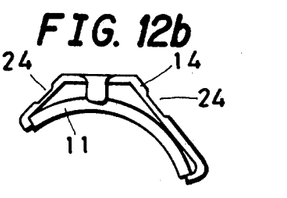
FIG. 12(b) is a front elevational view of FIG. 12(a)
Figure 12C:
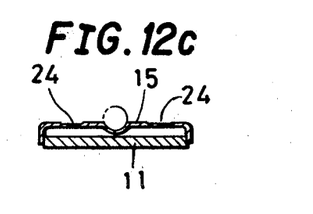
FIG. 12(c) is a side elevational view of FIG. 12(a).

The shell holder 12 of FIGS. 12(a) through 12(c) is a combined modification of those shown in FIGS. 6(a) through 6(c) and 10(a) and 10(b). A smaller thickness portion 24 is formed on each of four arm portions 14 and 15 to provide the shell holder 12 with an additional resiliency. The narrower arm portions 15 may, however, be formed with even thickness without appreciably impairing the resiliency of the shell holder 12.

The shell holders hereinabove described in various forms are all made of thin elastic sheet metal to provide a resilient support for the bearing shell. It will further be noted that the ball receiving recess 13 is spaced from the bearing shell 11 in any of the various bearing pad arrangements hereinabove described.

The operation of the gas bearing device according to this invention will be described with reference to the preferred embodiment shown in FIG. 4. When the shaft 1 is rotated in the direction of the arrow P, the air in the area adjacent to the periphery of the shaft 1 is caused to move in the same direction because of its viscosity. The air flows into the clearance 3 and exerts a force against the bearing pad 10 because of the dynamic pressure generated and the curved shape of the bearing shell 11. During the initial period of operation, the resultant force F, which is determined by the force of the air and the weight of the bearing pad 10, is directed along a line spaced from the center C of the steel ball 5 (to the right in FIG. 4), so that the pad 10 is caused to rotate counterclockwise (in FIG. 4) about the center C of the ball 5 with the leading edge 11a of the bearing shell 11 moving away from the shaft 1 while the trailing edge 11b approaches the shaft 1. As the pad 10 is rotated, the line along which the the force F is directed approaches the steel ball 5 (by moving to the left in FIG. 4) and finally coincides with a line passing through the center C of the ball 5. Thus, the force F coincides with the reaction force R generated at the ball receiving recess 13, whereupon the bearing pad 10 ceases to rotate and maintains a predetermined position relative to the shaft 1, in which the clearance 3 has a curved wedge-like vertical sectional outline which is larger at the leading edge 11a of the bearing shell 11 than at the trailing edge 11b thereof. As far as what has heretofore been described is concerned, the gas bearing device of this invention is adapted to operate exactly in the same manner as the gas bearing device known in the art does.

A particular advantage of the device according to this invention with respect to function or performance is its adaptability for a sudden change in the operating conditions of the gas turbine or any other equipment on which it is installed. As hereinbefore mentioned, the bearing shell 11 and the shell holder 12 are both made of a relatively thin material and accordingly, the total weight of the bearing pad 10 is so small that the pad 10 has only a small moment of inertia about the center of its rotation, i.e., the center C of the ball 5. Moreover, the bearing shell 11 is resiliently supported on the shell holder 12 which is made of an elastic material. Therefore, in the event of a sudden change in the dimension of the clearance 3 upon variation in the operation conditions of the turbine etc., the pad 10 is capable of displacing itself relative to the shaft 1 to thereby maintain an adequate clearance 3 between the bearing shell 11 and the shaft 1. Furthermore, since the bearing shell 11 has only a small heat capacity because of its relatively small thickness, the bearing shell 11 quickly expands and moves away from the shaft 1 upon expansion of the shaft 1 in the event of elevation in the temperature in the vicinity of the shaft 1 as a result of a sudden change in the load being applied to the shaft 1 during operation, so that no undesirable frictional contact occurs between the bearing shall 11 and the shaft 1. The advantage hereinabove pointed out may equally be obtained from any of the modified forms of the bearing pad arrangements illustrated in FIGS. 7 through 12.

Although reference has been specifically made to "air" in the foregoing explanation of the operation of the device according to this invention, it will be understood that the device of this invention may equally be used for applications where any other gaseous substance is involved.

While the invention has been described with reference to a preferred embodiment thereof and a number of modifications thereto, it is to be understood that further modifications or variations may be made by those skilled in the art without departing from the scope of the invention which is defined by the appended claims.

What is claimed is:

1. In combination with a gas bearing wherein a plurality of arcuately curved bearing pads are positioned one adjacent to another encircling a rotatable shaft in a circle of diameter greater than the diameter of said shaft to support said shaft in a floating fashion during rotation of said shaft, said bearing pads each being supported on a pivot adjustably secured to a bearing housing, the improvement wherein each of said bearing pads comprises:

a relatively thin arcuately curved bearing shell having an inner surface facing the peripheral surface of said shaft in a manner substantially complementary to, but spaced from, said peripheral surface; and means for holding said bearing shell, said means being made of thin elastic material and extending over the outer surface of said bearing shell, said means being supported on said pivot and engaged with at least one pair of opposite edges of said bearing shell for resiliently supporting said bearing shell on said pivot.

2. The invention as defined in claim 1 wherein said shell holder is substantially cross-shaped and has a pair of relatively wide arm portions extending in opposite directions from the central portion thereof and a pair of relatively narrow arm portions disposed at about right angles to said wide arm portions and extending in opposite directions from said central portion, each of said wide and narrow arm portions being formed at its free end with an inwardly bent portion engaging one edge of said bearing shell.

3. The invention as defined in claim 2 wherein each of said narrow arm portions of said shell holder is formed with a fold contacting the outer surface of said bearing shell, while one of said wide arm portions is in contact with the outer surface of said bearing shell.

4. The invention as defined in claim 2 wherein said bearing shell is formed with a cut on each of a pair of opposite edges thereof, and each of said inwardly bent portions of said wide arm portions is engaged with one of said cuts.

5. The invention as defined in claim 2 wherein said shell holder is formed with a reduced thickness portion on at least one of said arm portions.

6. The invention as defined in claim 5 wherein said reduced thickness portion is provided on each of said wide arm portions.

7. The invention as defined in claim 1 wherein said shell holder comprises a relatively wide elongate member formed at each end thereof with an inwardly bent portion engaging one edge of said bearing shell.

8. The invention as defined in claim 7 wherein said elongate member is formed with at least one fold contacting the outer surface of said bearing shell.

9. The invention as defined in claim 7 wherein said bearing shell is formed with a cut on each of a pair of opposite edges thereof, and each of said inwardly bent portions of said elongate member is engaged with one of said cuts.

10. The invention as defined in claim 7 wherein said elongate member is formed with a reduced thickness portion on at least one intermediate portion thereof.

* * * * *